Figure 1:
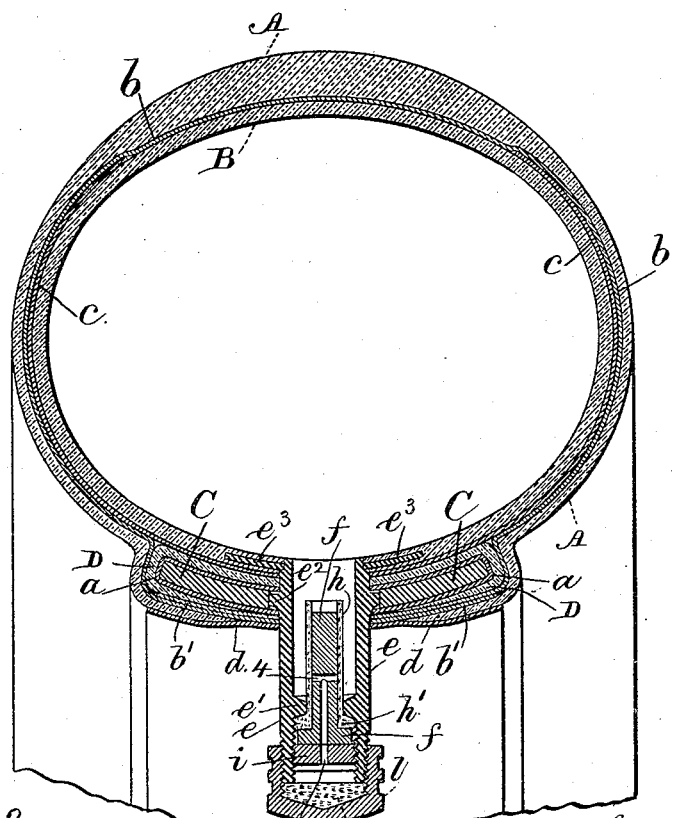

(No Model.)

E. R. DE WOLFE.
AIR VALVE FOR INFLATABLE WHEEL TIRES.

No. 460,714. Patented Oct. 6, 1891.

Witnesses
Chas. H. Smith
J. Staib

Inventor
Edward R. De Wolfe
per Lemuel W. Serrell
atty

THE NORRIS PETERS CO., PHOTO-LITHO., WASHINGTON, D. C.

UNITED STATES PATENT OFFICE.

EDWARD R. DE WOLFE, OF NEW YORK, N. Y.

AIR-VALVE FOR INFLATABLE WHEEL-TIRES.

SPECIFICATION forming part of Letters Patent No. 460,714, dated October 6, 1891.

Application filed June 17, 1891. Serial No. 396,540. (No model.)

*To all whom it may concern:*

Be it known that I, EDWARD R. DE WOLFE, a citizen of the United States, residing at the city, county, and State of New York, have invented a new and useful Improvement in Air-Valves for Pneumatic or Inflatable Wheel-Tires, of which the following is a specification.

Pneumatic or inflatable wheel-tires—such as those shown in the patents of Amos W. Thomas, No. 399,354, granted March 12, 1889, et al., and John B. Dunlop, Reissue No. 11,153, granted March 24, 1891, and Patent No. 453,550, issued June 2, 1891—are filled with air through an air-valve in the felly of the wheel by an air-pump and connecting-hose. The air-valves at present in use are crude affairs, very liable to leak and blow out; and the object of my invention is to produce an efficient and strong valve that is not liable to get out of order and one that closes automatically.

In carrying out my invention I employ a tubular cylindrical case that passes through the felly and inner hollow expansible tube, and that is connected to either the felly or tube or both. Within the case and resting against an internal rib, forming a seat, is a cylindrical plug and its surrounding rubber sleeve. The plug is perforated for the passage of air, as is also a screw-disk that keeps the plug and sleeve against their seat. A screw-cap and internal washer covers the end of the case and excludes dust, dirt, and water. The air-pump hose has a coupling end that screws upon the end of the case when the screw-cap is removed, and air is easily forced into the hollow wheel-tire through the valve, the air expanding the rubber sleeve in its passage. The rubber sleeve contracts automatically and closes and retains the internal air-pressure when the pumping of air is stopped.

In the drawings I have represented for convenience a pneumatic tire of the form shown in the Dunlop patents, in which—

Figure 2:
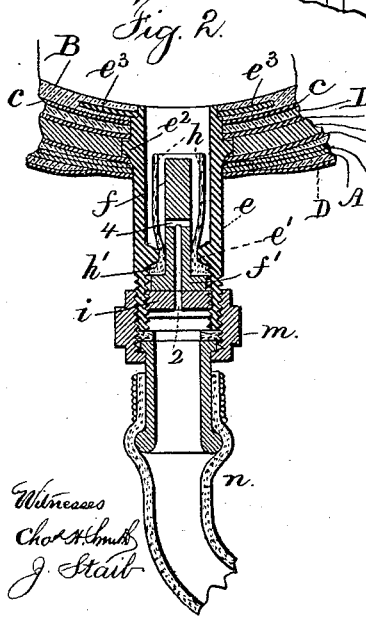
Figure 3:
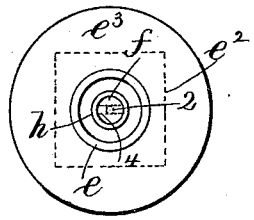
Figure 4:
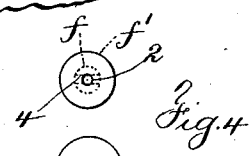

Figure 1 is a cross-section of the tire and rim and my improved valve in enlarged size as it would appear when the tire is inflated. Fig. 2 is a partial cross-section in the act of inflating the tire. Fig. 3 is an inverted plan view of the valve, and Fig. 4 is an end view of the valve-case and perforated disk.

The pneumatic or inflatable tire shown in the drawings as illustrating the application of my improved air-valve is constructed according to the Dunlop patents, as follows: A represents the outer bearing-surface of rubber, secured at its edges to the covering of the rim or felly C and having a thickened tread portion. B represents the inner hollow expansible tube of rubber. The felly C has a canvas wrapping $a$, and around this is a wrapping of rubber D. $b\,c$ represent the portions making up the non-expansible strengthening and confining covering of canvas or the like around the tube B, and whose free edges $b'$ are lapped and secured to the felly-covering beneath the edges of the outer bearing-surface A and the strengthening-strip $d$.

Further description of this well-known form of wheel-tire is not herein necessary.

My improved valve is adapted to any form of pneumatic or inflatable tire, although shown with the Dunlop tire in the present case.

My improved air-valve consists of a tubular cylindrical case $e$, that is screw-threaded both internally and externally at one end. This case has an internal rib forming a seat at $e'$, a square shoulder portion at $e^2$, and a circular curved disk $e^3$, soldered or otherwise secured on at one end of the case $e$.

$f$ represents a cylindrical plug having a head $f'$ and having a central hole 2 and lateral hole 4, and surrounding this plug is a rubber valve-sleeve $h$, having one end $h'$ thickened and adjacent to the head $f'$. The plug $f$ and valve-sleeve $h$ fit freely within the stem $e$ and bear upon the rib $e'$, and a perforated disk $i$, with slotted face and peripheral screw-thread, screws into the outer end of the case, and, acting against the head $f'$, carries the plug-head $f'$ and the thickened end of the sleeve $h$ to a secure seat against the rib $e'$. A screw-cap $l$, having an internal washer $l'$, screws upon this end of the stem $e$ and completes the valve and closes the end of the case, making the same dust and water tight.

In the manufacture of the inner hollow expansible tube B the case $e$ is put in the mold with the disk $e^3$ within, and this rubber tube is molded and vulcanized around the end of the case $e$ and disk $e^3$, so that said disk is held securely within the material of the tube and cannot be separated unless torn away. The outer non-expansible covering is now to be formed around or drawn over this tube B, and when these parts are brought to the felly of the wheel to be connected therewith the case $e$ is put through a square hole in the rim provided to fit the square shoulder $e^2$. This prevents the case $e$ turning when screwing or unscrewing the cap $l$ or the air-pump coupling. The edges $b'$ and the edges of the outer covering A and the strengthening-strip $d$ are afterward connected to the rim or felly in the usual manner.

When the tire is inflated with air, a coupling $m$ is connected to the end of the case $e$ and a pipe $n$ extends to an air-pump. The air is forced into the hollow tire through the hole in the disk $i$, through the central hole 2 and lateral hole 4, and expands or distends the rubber sleeve $h$ in its passage, as seen in Fig. 2. As soon as the desired pressure is reached in the hollow inflatable tire and the air-pump stopped the rubber sleeve contracts automatically around the plug $f$, and access to the hole 4 is closed and the escape of air from the tire is prevented. The coupling $m$ can now be removed and the screw-cap $l$ substituted without risk of the air escaping.

My improved air-valve is adapted to any form of pneumatic or inflatable wheel-tire and to any form of felly, as the length or breadth of the same may be varied, according to the requirements of the case, without departing from the essential features of the invention.

The air may be readily released from the tire, if desired, at any time by simply removing the cap $l$ and partially unscrewing the disk $i$, when the air will pass around the liberated plug and sleeve and through the opening in the disk and escape.

I claim as my invention—

1. The herein-described air-valve, consisting, essentially, of a tubular cylindrical case, a perforated plug, and an elastic device for permitting the entrance of air, but closing automatically to prevent its escape, substantially as set forth.

2. The combination, with an inflatable or hollow expansible tube B, of a valve through which air is forced into the tube, and a disk connected to the inner end of the valve and around which disk the tube B is molded and vulcanized, substantially as set forth.

3. The combination, with a hollow expansible tube B and a wheel-felly C, having a square opening therein, of a valve through which air is forced into the tube B, a disk $e^3$, connected to the inner end of the valve-case and embedded and vulcanized within the material of said tube, and a square shoulder $e^2$ on the valve-case, entering the opening in the felly, substantially as and for the purposes set forth.

4. The combination, with the case $e$ and its rib $e'$, of the perforated plug $f$, the rubber sleeve $h$, and the perforated screw-disk $i$ or equivalent device for seating the plug and rubber sleeve, substantially as set forth.

5. The combination, with the case $e$, its rib $e'$, the removable cap $l$, and means, substantially as specified, for connecting the same to a pneumatic or hollow inflatable wheel-tire, of the plug $f$ and head $f'$, perforated centrally and laterally, the surrounding rubber sleeve $h$, the perforated screw-disk $i$, and a cap for closing the outer end of the case $e$, substantially as set forth.

6. The combination, with the pneumatic or hollow inflatable wheel-tire and its rim or felly, of the case $e$, its internal rib $e'$, its square shoulder $e^2$, end disk $e^3$, and screw-cap $l$, the cylindrical plug $f$ and head $f'$, perforated centrally and laterally, the rubber sleeve $h$ and thickened end $h'$, and the screw-disk $i$, substantially as and for the purposes set forth.

Signed by me this 13th day of June, A. D. 1891.

E. R. DE WOLFE.

Witnesses:
GEO. T. PINCKNEY,
HAROLD SERRELL.